No. 635,926. Patented Oct. 31, 1899.
V. L. GLAZE.
BICYCLE BRAKE.
(Application filed July 26, 1899.)
(No Model.)
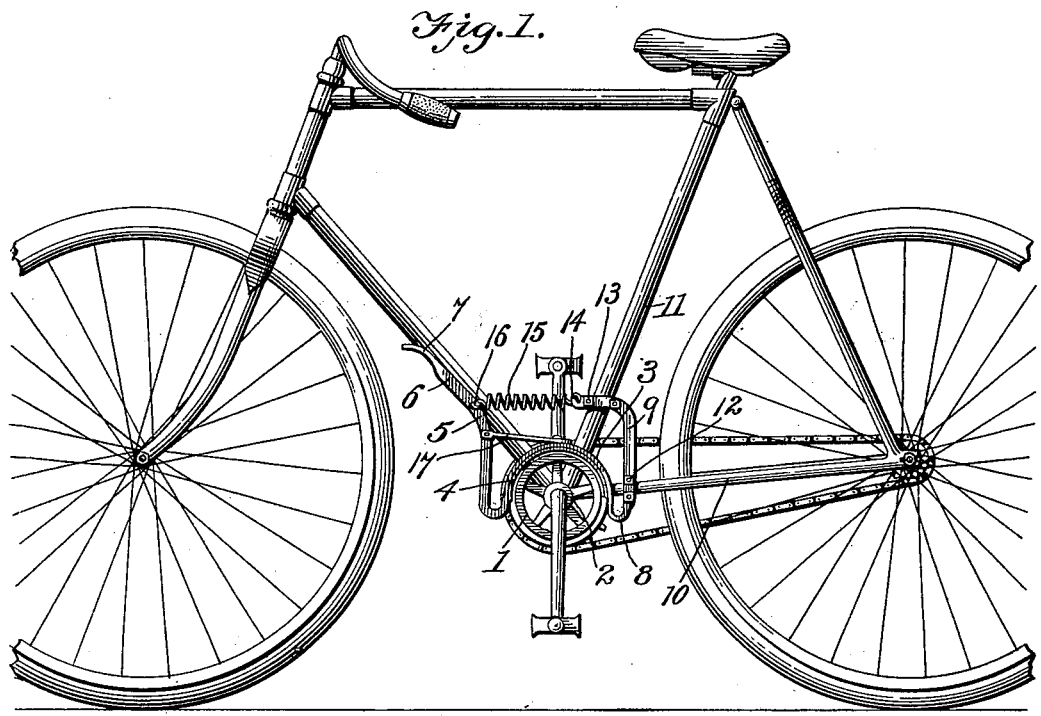
Fig. 1.
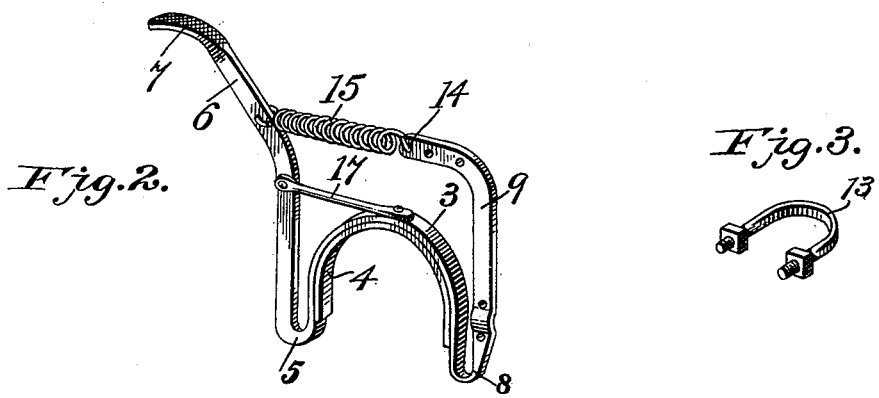
Fig. 2.
Fig. 3.
Witnesses
Edwin G. McKee,
R. M. Smith
Inventor
Virgil L. Glaze.
by E. G. Siggers
Attorney

UNITED STATES PATENT OFFICE.

VIRGIL L. GLAZE, OF WALNUT GROVE, WEST VIRGINIA.

BICYCLE-BRAKE.

SPECIFICATION forming part of Letters Patent No. 635,926, dated October 31, 1899.

Application filed July 26, 1899. Serial No. 725,159. (No model.)

*To all whom it may concern:*

Be it known that I, VIRGIL L. GLAZE, a citizen of the United States, residing at Walnut Grove, in the county of Roane and State of West Virginia, have invented a new and useful Bicycle-Brake, of which the following is a specification.

This invention relates to vehicle-brakes, and is especially designed for use upon bicycles and other foot-propelled vehicles.

The aim of the present invention is to provide a simple, effective, and reliable brake which may be used upon a bicycle or similar vehicle in which on account of the employment of pneumatic tires it is impracticable to apply braking power to the rims or tires of the carrying-wheels.

It is well understood in the art that it is extremely injurious to a pneumatic tire to apply a brake directly thereto, and it has therefore become necessary to apply a brake to some other portion of the bicycle or vehicle. The brake contemplated in this invention is designed for the purpose above outlined, and the detailed objects and advantages will be fully pointed out in the course of the ensuing description.

The invention consists in a brake embodying certain novel features and details of construction and arrangement of parts, as hereinafter fully described, illustrated in the drawings, and pointed out in the claims.

In the accompanying drawings, Figure 1 is a side elevation of a sufficient portion of a bicycle to illustrate the application of the improved brake thereto. Fig. 2 is a detail perspective view of the brake detached. Fig. 3 is a detail perspective view of one of the attaching-clips.

Similar numerals of reference designate corresponding parts in all the figures of the drawings.

In carrying out the present invention and applying the brake to a bicycle a friction-wheel 1 is mounted fast on the crank-axle 2 of the bicycle and preferably upon the opposite side to the ordinary sprocket-wheel of the driving mechanism and between the end crank on that side of the machine and the adjacent end of the crank-hanger.

The brake contemplated in this invention is designed to be applied by foot-power and is constructed in the main in one piece comprising a central curved portion 3, conforming substantially in curvature to the rim of the friction-wheel 1 and extending substantially half-way around said wheel. This curved portion forms the brake-shoe portion of the device, being in the nature of a band-brake and having applied to its concaved side a lining 4, of leather or other suitable material, which will increase the frictional properties of the brake-shoe, said lining being secured thereto in any convenient manner. The brake shoe or band 3 extends, preferably, over the upper half of the friction-wheel 1, and its forward end is recurved, as shown at 5, and extended upward and forward to provide a foot-lever portion 6, the extremity of which is flattened or enlarged to form a foot-piece 7 to receive pressure from the foot of the rider. The shoe or band 3 is recurved at its rear end, as shown at 8, and extended upward and forward to form an attaching bracket portion 9, which intersects or crosses one of the bottom runs 10 and the seat-post tube 11 of the machine-frame, said bracket portion or attaching portion 9 being secured to said bars of the machine-frame by means of U-shaped clips 12 and 13, which embrace said bars and have their ends inserted through openings in the part 9 and threaded to receive nuts by means of which said bracket is firmly secured to the bars 10 and 11 of the machine-frame. The extremity of the bracket-arm 9 is extended sufficiently in advance of the seat-post tube to enable an eye or opening 14 to be formed therein, the eye or opening being designed to receive one end of a contractile spring 15, the opposite or forward end of which is connected at 16 to the lever-arm 6.

The portions comprised by the shoe 3, lever-arm 6, and bracket-arm 9 are preferably formed from a single piece of spring metal, and the device is so mounted on the machine-frame that the shoe 3 springs of its own resiliency away from and out of contact with the friction-wheel 1, so as to allow said friction-wheel to turn without any resistance whatever on the part of the brake. In order to apply the brake, the lever-arm 6 is pressed downward, which causes the flexible or spring shoe 3 to bind around and against the periphery of the wheel 1, the power of the brake being in proportion to the amount of pressure brought to bear on the lever-arm 6. The contractile spring 15 assists in throwing the brake-shoe out of contact with the friction-wheel, and in order to insure the even application of the brake-shoe to the wheel a stay or brace 17 is interposed between and connected to the lever-arm 6 and the brake-shoe 3, said stay or brace connecting with the shoe at an intermediate point, as illustrated in the drawings. This brace prevents an excessive amount of relative movement between the brake-shoe and lever-arm and insures the proper application of the shoe to the friction-wheel.

The brake above described is exceedingly simple in construction, there are no delicate parts which are liable to get out of order, and the brake, which is easily applied, is instantly thrown out of action as soon as pressure on the lever-arm is relieved. The rider can apply the brake with one foot while back-pedaling with the other foot, and both hands are left entirely free with which to steer the machine, which is advantageous in descending steep and rough grades. The brake is also easily and readily applicable to any standard make of bicycle and can be attached by an unskilled person and readily removed when not desired for further use.

From the foregoing it is thought that the construction, operation, and many advantages of the herein-described bicycle-brake will be apparent to those skilled in the art without further description, and it will be understood that changes in the size, shape, proportion, and minor details of construction may be resorted to without departing from the spirit or sacrificing any of the advantages of the invention.

Having thus described my invention, what I claim as new, and desire to secure by Letters Patent, is—

1. A bicycle-brake comprising an arcuate spring-shoe, an integral attaching bracket-arm at one end thereof, and an integral lever-arm at the opposite end thereof, both of said arms being formed by outwardly recurving or bending the extended end of the shoe.

2. In a vehicle-brake, the combination with a rotary axle and a friction-wheel fast thereon, of a friction-band for said wheel having its ends outwardly recurved to form respectively a foot-lever arm and a bracket-arm for attachment to the vehicle-frame, the said arms projecting above the friction-wheel, and a contractile spring connecting said arms.

3. In a vehicle-brake, the combination with a rotary axle, and a friction-wheel fast thereon, of a friction-band for said wheel constructed of yielding material and having its ends outwardly recurved to form respectively a foot-lever arm and a bracket-arm for attachment to the vehicle-frame, and a contractile spring connected at one end to said lever-arm, and at its other end to a fixed part.

4. In a vehicle-brake, the combination with a rotary axle, and a friction-wheel fast thereon, of a friction-band for said wheel constructed of yielding material and having its ends outwardly recurved to form respectively a foot-lever arm and a bracket-arm for attachment to the vehicle-frame, and a stay interposed between and connecting said lever-arm and friction-band.

In testimony that I claim the foregoing as my own I have hereto affixed my signature in the presence of two witnesses.

VIRGIL L. GLAZE.

Witnesses:
M. F. LEWELLEN,
J. R. PRITCHARD.